US012605951B2

(12) United States Patent
Beppu

(10) Patent No.: US 12,605,951 B2
(45) Date of Patent: Apr. 21, 2026

(54) RECORDING DEVICE

(71) Applicant: SEIKO EPSON CORPORATION, Tokyo (JP)

(72) Inventor: Yukiya Beppu, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 147 days.

(21) Appl. No.: 18/519,162

(22) Filed: Nov. 27, 2023

(65) Prior Publication Data

US 2024/0174012 A1 May 30, 2024

(30) Foreign Application Priority Data

Nov. 28, 2022 (JP) ................................ 2022-188955

(51) Int. Cl.
*B41J 29/02* (2006.01)

(52) U.S. Cl.
CPC .................................... *B41J 29/02* (2013.01)

(58) Field of Classification Search
CPC ....................................................... B41J 29/02
See application file for complete search history.

(56) References Cited

U.S. PATENT DOCUMENTS

2011/0222948 A1* 9/2011 Asada .................. B41J 13/0081 400/611
2012/0105542 A1* 5/2012 Murray .................. B41J 19/202 347/37
2014/0232795 A1 8/2014 Yanagishita
2016/0059597 A1 3/2016 Suzuki

FOREIGN PATENT DOCUMENTS

JP 2014-156062 A 8/2014
JP 2014-237307 A 12/2014

* cited by examiner

*Primary Examiner* — Justin Seo
(74) *Attorney, Agent, or Firm* — WORKMAN NYDEGGER

(57) ABSTRACT

A recording device includes a medium moving unit that moves a medium support unit supporting a medium, a recording unit that is caused to perform scanning to perform recording on the medium, a base frame that has a flat plate shape and supports the medium moving unit, and a first middle frame and a second middle frame that are supported by the base frame and disposed in a posture intersecting the base frame. When a terminal end portion located at a terminal end, of the base frame, a terminal end portion located at a terminal end, of the first middle frame, and a terminal end portion located at a terminal end, of the second middle frame are caused to face downward and brought into contact with a horizontal surface, the center of gravity of the recording device is positioned vertically above a region surrounded by the terminal end portions.

6 Claims, 7 Drawing Sheets

RECORDING DEVICE

The present application is based on and claims priority from JP Application Serial Number 2022-188955, filed Nov. 28, 2022, the disclosure of which is hereby incorporated by reference herein in its entirety.

BACKGROUND

1. Technical Field

The present disclosure relates to a recording device that performs recording on a medium.

2. Related Art

JP-A-2014-156062 discloses a relatively large recording device that records an image or the like on a medium. This recording device includes a moving unit that moves the medium along a base that protrudes in the front-rear direction, and a recording unit that extends in the left-right direction, which is a moving direction of a carriage, and that performs recording on the medium. When transporting a recording device, which is long in two intersecting directions among the horizontal directions, like the recording device described above, there is a case in which the recording device cannot pass through a narrow entrance while keeping a horizontal posture. Therefore, when transporting the recording device, it has been necessary to cause the device to be in an upright posture so that the device is long in the vertical direction.

However, when a device which is normally used in a horizontal posture is caused to be in an upright posture, the posture of the device becomes unstable and the device easily falls over. Thus, it is necessary to prepare a jig for stabilizing the device and to fix the device to the jig with the device in the upright posture.

SUMMARY

A recording device includes a moving unit configured to move a medium support unit supporting a medium along a first direction, a recording unit including a recording head configured to perform recording on the medium, and configured to perform scanning along a second direction intersecting the first direction, a first frame having a flat plate shape along the first direction and the second direction, and configured to support the moving unit, and a second frame and a third frame supported by the first frame and disposed along the first direction in a posture intersecting the first frame. The moving unit is disposed between the second frame and the third frame in the second direction. A first terminal end portion located at a terminal end on one side of the first frame in the first direction is disposed between a second terminal end portion located at a terminal end on the one side of the second frame and a third terminal end portion located at a terminal end on the one side of the third frame. When the first terminal end portion, the second terminal end portion, and the third terminal end portion are caused to face downward and brought into contact with a horizontal surface, a center of gravity of the recording device is positioned vertically above a region surrounded by the first terminal end portion, the second terminal end portion, and the third terminal end portion.

DESCRIPTION OF EMBODIMENTS

An embodiment of a recording device 1 will be described below with reference to the accompanying drawings. The recording device 1 according to the present embodiment is, for example, an inkjet-type printer configured to discharge ink, which is an example of a liquid, onto a medium, which is an object on which recording is performed, and to record an image such as characters or a photo on the medium. The material of the medium is not limited to paper, and various materials such as textiles including cloth and woven fabric, vinyl chloride resin, and the like can be used.

Figure 3:
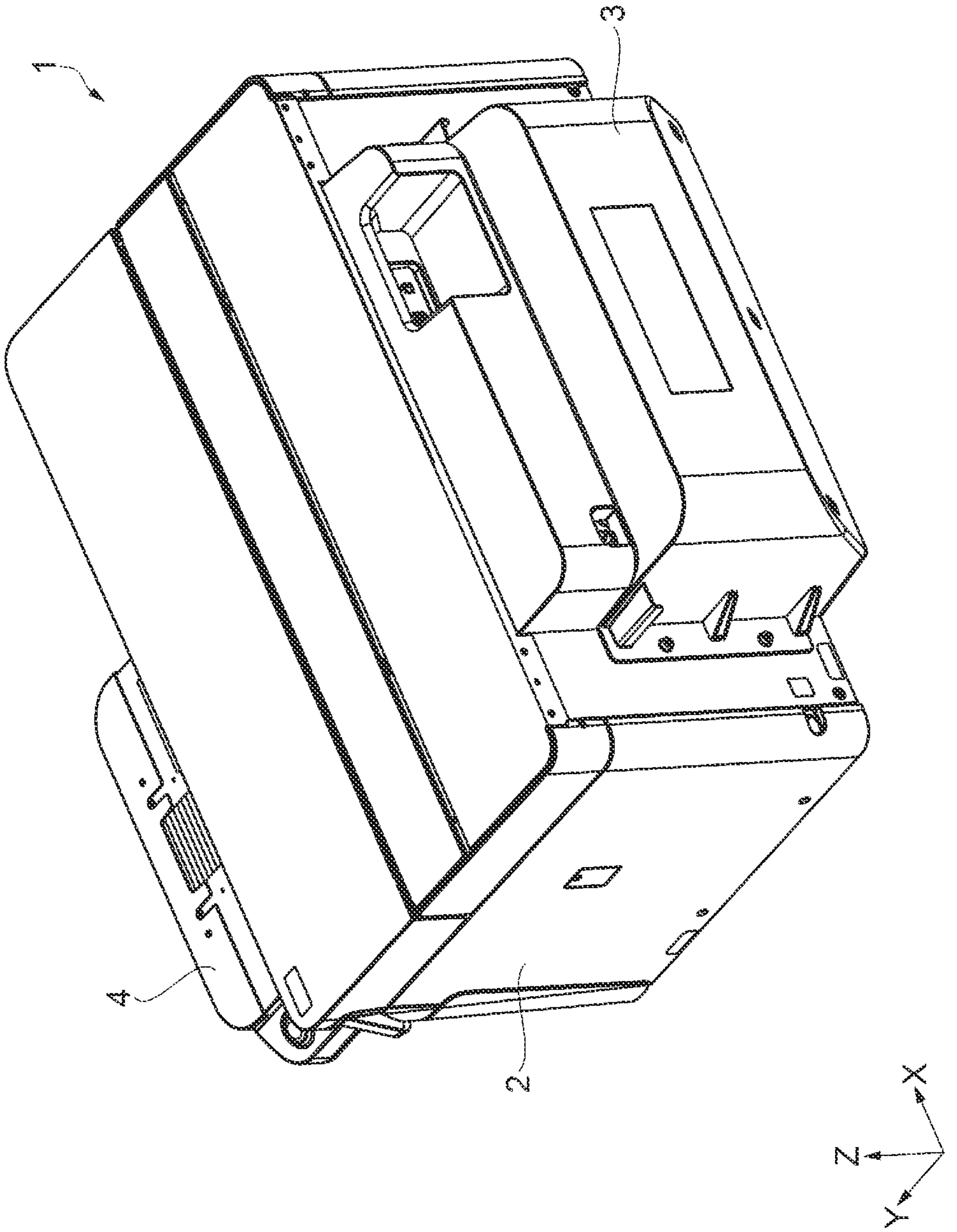
FIG. 3 is a perspective view of the rear side of the recording device.

In each of the drawings except for FIG. 3, an X-axis, a Y-axis, and a Z-axis intersecting each other are illustrated. Typically, the X-axis, the Y-axis, and the Z-axis are orthogonal to each other. The X-axis is parallel to an installation surface of the recording device 1, and corresponds to a width direction of the recording device 1. The Y-axis is parallel to the installation surface of the recording device 1, and corresponds to a depth direction of the recording device 1. The Z-axis is perpendicular to the installation surface of the recording device 1, and corresponds to a height direction of the recording device 1.

Hereinafter, a +Y direction parallel to the Y-axis is a direction from the front side to the rear side of the recording device 1, and a −Y direction parallel to the Y-axis is a direction opposite to the +Y direction. A +X direction parallel to the X-axis is a direction from the front side to the left side of the recording device 1, and a −X direction parallel to the X-axis is a direction opposite to the +X direction. A +Z direction parallel to the Z-axis is an upward direction, and a —Z direction parallel to the Z-axis is a direction opposite to the +Z direction.

Figure 1:
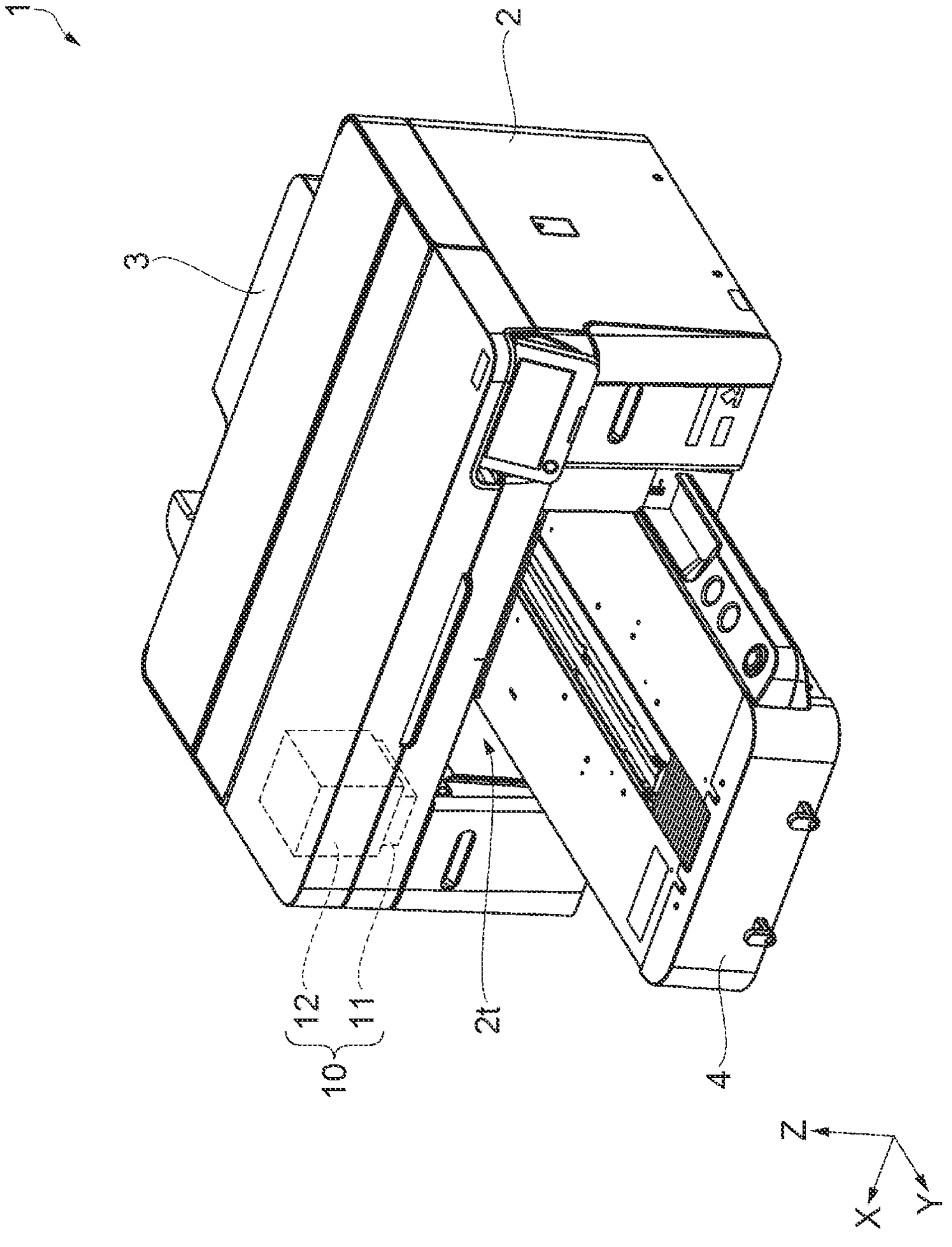
FIG. 1 is a perspective view illustrating the front side of a recording device.
Figure 2:
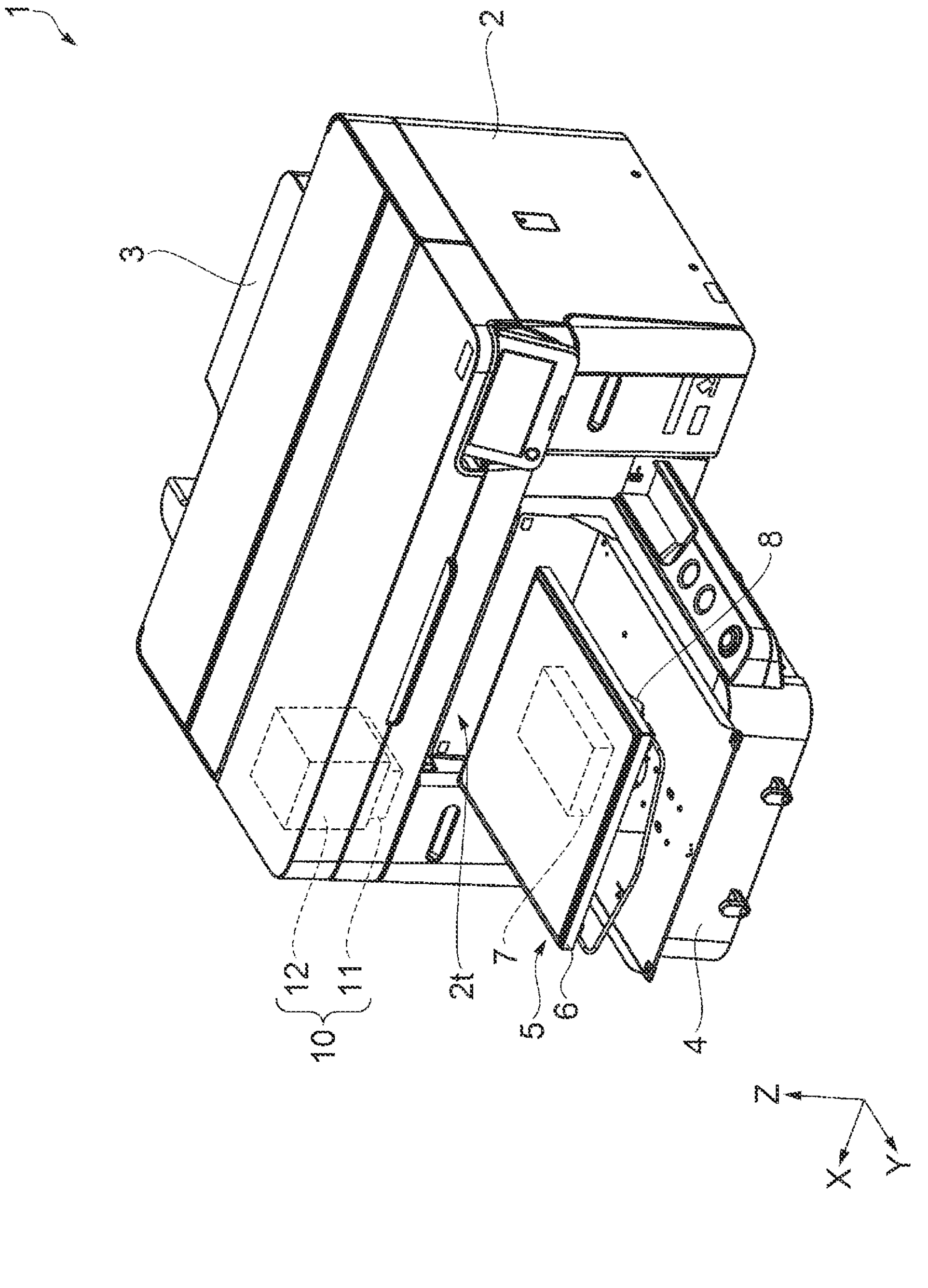
FIG. 2 is a perspective view illustrating the front side of the recording device.
Figure 4:
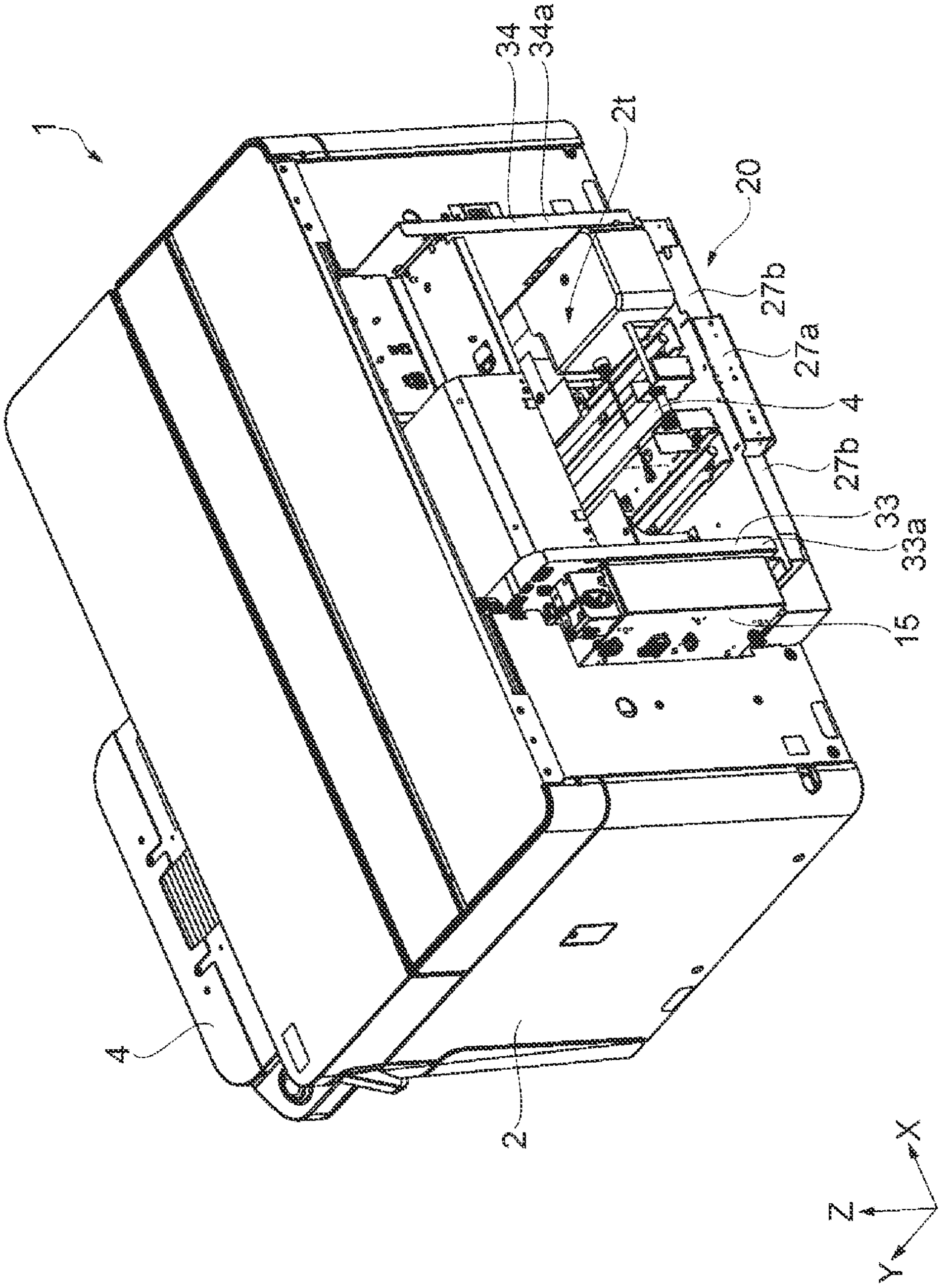
FIG. 4 is a perspective view illustrating the rear side of the recording device.

FIGS. 1 and 2 are perspective views illustrating the front side of the recording device 1 according to the present embodiment. FIG. 1 is a diagram illustrating a state in which a medium support unit 5 described below is positioned inside a housing 2, and FIG. 2 is a diagram illustrating a state in which the medium support unit 5 is positioned outside the housing 2. FIGS. 3 and 4 are perspective views illustrating the rear side of the recording device 1. FIG. 3 is a diagram illustrating a state in which a rear cover 3 described below is mounted on the recording device 1, and FIG. 4 is a diagram illustrating a state in which the rear cover 3 is removed from the recording device 1.

As illustrated in FIGS. 1 to 4, the recording device 1 includes the housing 2 that accommodates a device main body. A through hole 2*t* penetrating from the front side to the rear side of the housing 2 is provided at the housing 2, and a medium moving unit 4 whose longitudinal direction is the ±Y directions is disposed so as to protrude from the through hole 2*t* in the +Y direction and the −Y direction. The medium moving unit 4 supports the medium support unit 5 that supports the medium, so that the medium support unit 5 is movable along the ±Y directions. The medium moving unit 4 is driven by a drive mechanism (not illustrated) to move the medium support unit 5 along the ±Y directions. The medium moving unit 4 corresponds to a moving unit, and the ±Y directions each correspond to a first direction. On the rear side of the housing 2, the through hole 2*t* is covered by the rear cover 3 having a box shape.

The medium support unit 5 includes a tray 6 that supports the medium, a stage 7 as a support table that supports the tray 6, and a base 8 that supports the stage 7. The stage 7 and the tray 6 are movable in the vertical direction with respect to the base 8, that is, in the ±Z directions by an elevating mechanism (not illustrated). In other words, the position of the medium in the height direction can be adjusted by the elevating mechanism. Note that the ±Z directions, which are the moving directions of the stage 7, may be directions slightly inclined from the vertical direction. Further, in the recording device 1, the stage 7 is configured to support the medium via the tray 6, but the stage 7 may be configured to directly support the medium.

A recording unit 10 constituting the device main body is disposed inside the housing 2. The recording unit 10 includes a recording head 11 that performs recording on the medium by discharging ink, and a carriage 12 that holds the recording head 11. The recording unit 10 is caused to perform scanning along the ±X directions by a drive mechanism (not illustrated). The recording device 1 causes the recording head 11 to discharge the ink toward the medium supported by the tray 6, while causing the carriage 12 to reciprocate in the ±X directions. Since the housing 2 is configured to cover an entire movement range of the carriage 12, the housing 2 has a long shape in the ±X directions. The ±X directions each correspond to a second direction.

When the medium support unit 5 is positioned further to the +Y direction than the through hole 2*t* of the housing 2, that is, when the medium support unit 5 is positioned outside the housing 2 (see FIG. 2), the medium is set on the tray 6. After the medium is set on the tray 6, the medium support unit 5 is transported by the medium moving unit 4 to the inside of the housing 2, that is, the inside of the through hole 2*t* (see FIG. 1), and moved to a recording start position located at an end portion of the medium moving unit 4 in the −Y direction. Then, the recording device 1 alternately repeats an operation of discharging the ink from the recording head 11 while moving the carriage 12 in the ±X directions, and an operation of moving the medium support unit 5 by a predetermined amount in the +Y direction, in order to record an image on a wide area of the medium.

As illustrated in FIG. 4, a power supply box 15 is disposed on the rear side of the recording device 1. The power supply box 15 generates power necessary for the recording device 1 to operate, and supplies the power to each component of the recording device 1.

Further, as illustrated in FIG. 4, a base frame 20 that supports the entire recording device 1 is disposed at the bottom of the recording device 1. The base frame 20 corresponds to a first frame.

Figure 5:
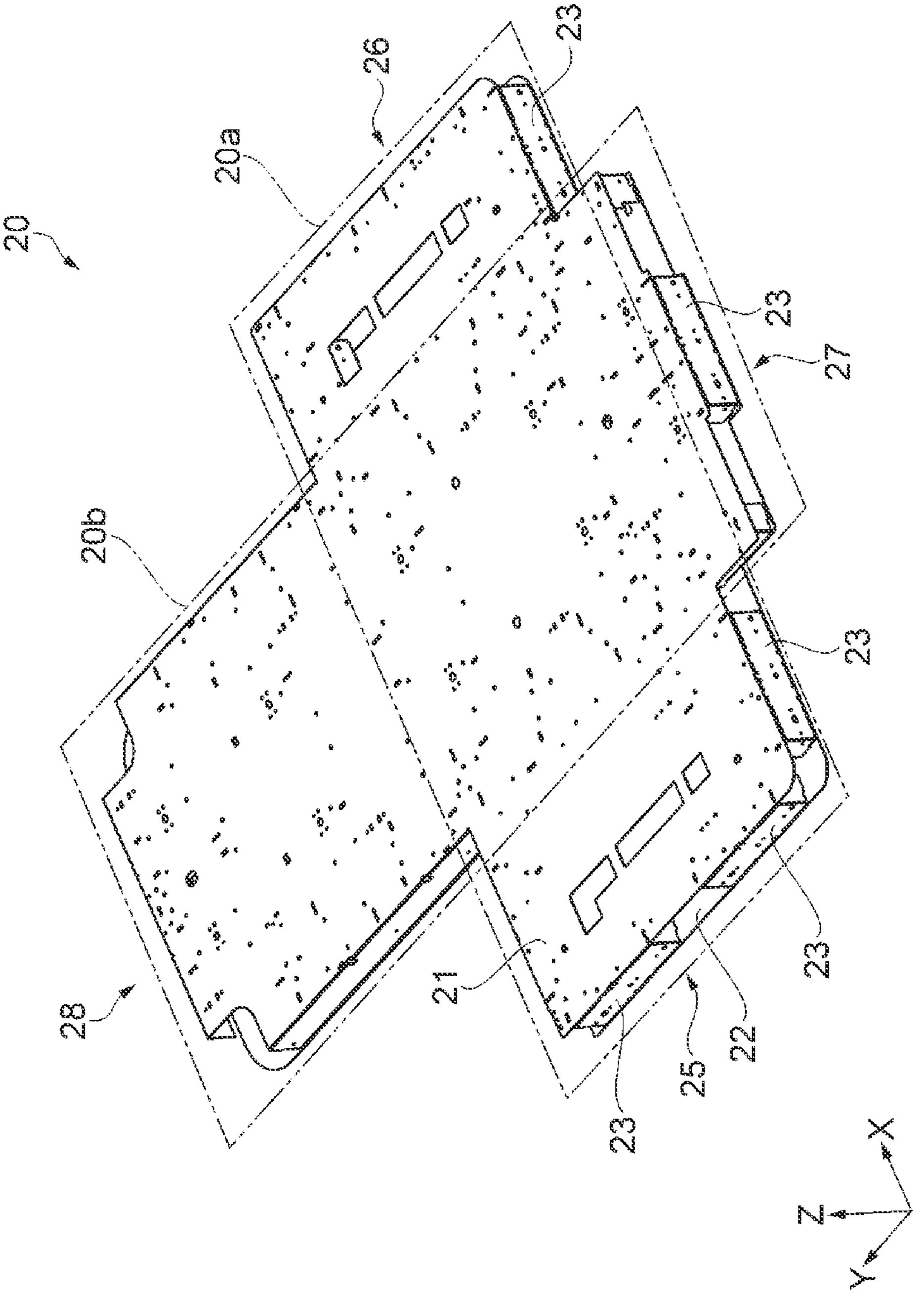
FIG. 5 is a perspective view illustrating a base frame.

FIG. 5 is a perspective view illustrating the base frame 20.

As illustrated in FIG. 5, the base frame 20 is a flat plate-shaped member as a whole, and is disposed along the XY plane. In other words, the base frame 20 is disposed along the ±X directions and the ±Y directions. Since the base frame 20 supports the device main body accommodated in the housing 2 that is long in the ±X directions and the medium moving unit 4 that is long in the ±Y directions, the base frame 20 has a substantially cross shape when viewed from the ±Z directions. Specifically, the base frame 20 includes a first support portion 20*a* extending in the ±X directions, and a second support portion 20*b* intersecting the first support portion 20*a* and extending in the ±Y directions. The first support portion 20*a* mainly supports the device main body covered by the housing 2, and the second support portion 20*b* mainly supports the medium moving unit 4. The base frame 20 is required to have a strength capable of withstanding the weight of the recording device 1, and is required to be flat with a high degree of accuracy because the base frame 20 serves as a reference for the moving operations of the medium support unit 5 and the carriage 12.

An end portion 25 of the base frame 20 in the −X direction, that is, the end portion 25 of the first support portion 20*a* in the −X direction extends in the ±Y directions. Similarly, an end portion 26 of the base frame 20 in the +X direction, that is, the end portion 26 of the first support portion 20*a* in the +X direction also extends in the ±Y directions. Further, an end portion 27 of the base frame 20 in the −Y direction, that is, the end portion 27 of the second support portion 20*b* in the −Y direction extends in the ±X directions as a whole, while including protruding and recessed portions. Similarly, an end portion 28 of the base frame 20 in the +Y direction, that is, the end portion 28 of the second support portion 20*b* in the +Y direction also extends in the ±X directions as a whole, while including protruding and recessed portions.

The base frame 20 includes a top surface member 21 formed from a substantially cross-shaped plate-shaped material, a bottom surface member 22 similarly formed from a substantially cross-shaped plate-shaped material and disposed in parallel to the top surface member 21, and a plurality of reinforcing members 23. The reinforcing member 23 is a member formed by bending a plate-shaped material, and is disposed between the top surface member 21 and the bottom surface member 22. The reinforcing members 23 are disposed more densely at positions at which a higher strength or a higher degree of flatness is required. Each of the top surface member 21, the bottom surface member 22, and the reinforcing member 23 is formed from a plate-shaped material made of steel, that is, a steel plate. As the steel plate, for example, a galvanized steel plate or the like is used. The base frame 20 is formed by joining the top surface member 21 and the reinforcing members 23 and joining the bottom surface member 22 and the reinforcing members 23 by welding.

Figure 6:
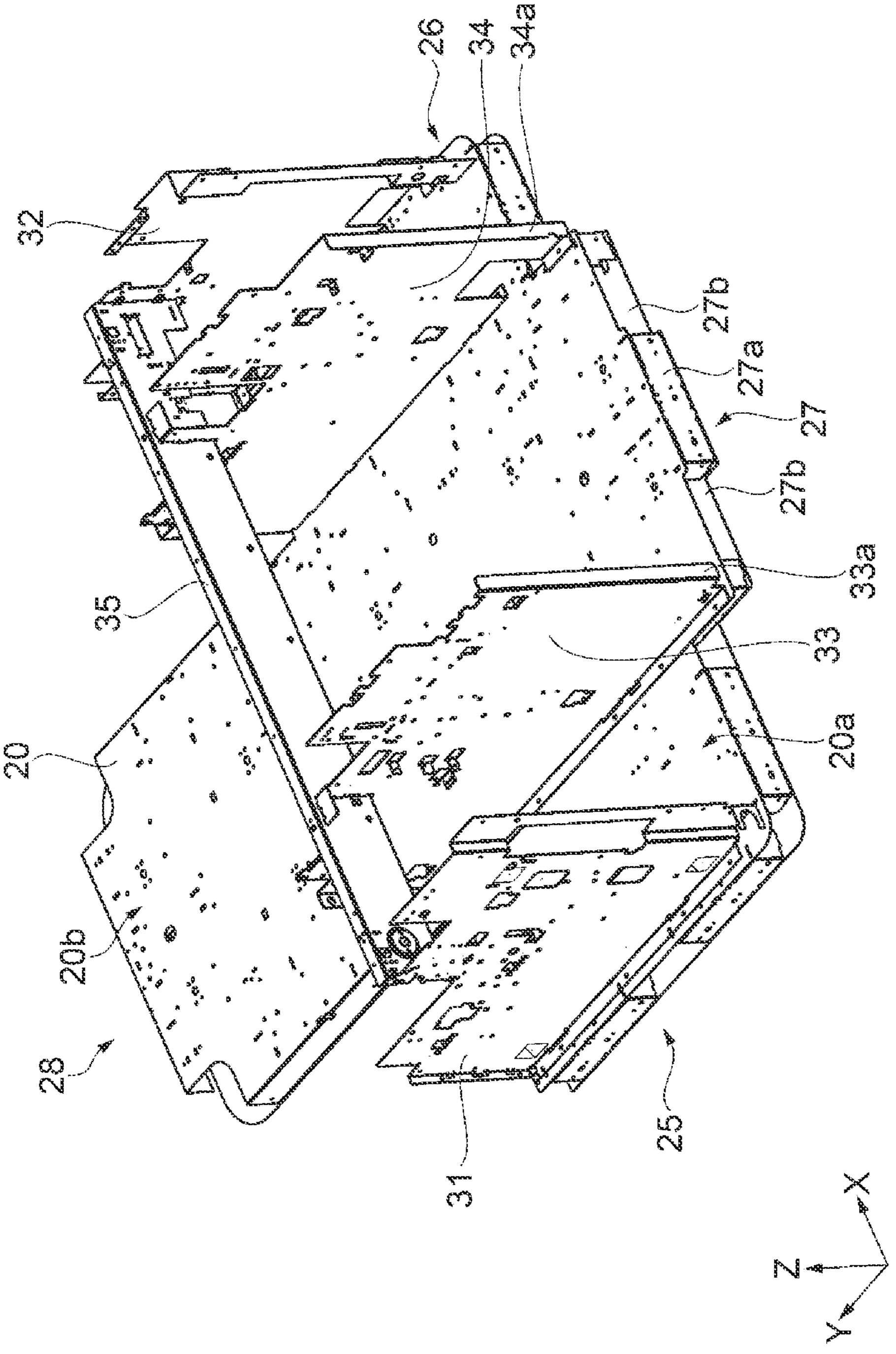
FIG. 6 is a perspective view illustrating a frame structure.

FIG. 6 is a perspective view illustrating a frame structure of the recording device 1.

As illustrated in FIG. 6, in a process of assembling the recording device 1, a plurality of frame members are disposed on the base frame 20. Specifically, a first side frame 31, a second side frame 32, a first middle frame 33, a second middle frame 34, and a main frame 35 are disposed on the base frame 20. Each of these frames is formed from a steel plate similarly to each of the members constituting the base frame 20.

The first side frame 31, the second side frame 32, the first middle frame 33, and the second middle frame 34 are flat plate-shaped members extending along the YZ plane, and more specifically, are parallel to the YZ plane. In other words, each of the first side frame 31, the second side frame 32, the first middle frame 33, and the second middle frame 34 is disposed along the ±Y directions in a posture intersecting the base frame 20. The first side frame 31, the second side frame 32, the first middle frame 33, and the second middle frame 34 are fixed to the base frame 20 by screws or the like, and are supported by the base frame 20.

The first side frame 31, the second side frame 32, the first middle frame 33, and the second middle frame 34 are separated from each other and disposed side by side in the ±X directions. Specifically, the first side frame 31 is disposed along the end portion 25 of the base frame 20 in the −X direction, and the second side frame 32 is disposed along the end portion 26 of the base frame 20 in the +X direction. Further, the first middle frame 33 is disposed along an end portion, in the −X direction, of the second support portion 20*b* of the base frame 20, and the second middle frame 34 is disposed along an end portion, in the +X direction, of the second support portion 20*b* of the base frame 20. The first middle frame 33 and the second middle frame 34 are disposed within a range from a region in which the first support portion 20*a* and the second support portion 20*b* intersect each other, to the end portion 27 of the second support portion 20*b* in the −Y direction. The first middle frame 33 corresponds to a second frame, and the second middle frame 34 corresponds to a third frame.

The main frame 35 is a flat plate-shaped member along the XZ plane, and has a shape elongated in the ±X directions. The main frame 35 is disposed within a range from the first side frame 31 to the second side frame 32, and is supported by the first side frame 31, the second side frame 32, the first middle frame 33, and the second middle frame 34. In other words, the main frame 35 is supported by the base frame 20 via the first side frame 31, the second side frame 32, the first middle frame 33, and the second middle frame 34.

Of the end portion 27 of the base frame 20 in the −Y direction, a terminal end portion 27*a* located at the terminal end thereof in the −Y direction, that is, the terminal end portion 27*a* protruding farthest in the −Y direction is located substantially at the center of the end portion 27 in the ±X directions. In other words, at the end portion 27 of the base frame 20 in the −Y direction, recessed portions 27*b* recessed in the +Y direction are formed on both sides of the terminal end portion 27*a* in the ±X directions. The terminal end portion 27*a* and the two recessed portions 27*b* extend in the ±X directions, respectively. The terminal end portion 27*a* corresponds to a first terminal end portion. Further, the −Y direction corresponds to one side in the ±Y directions, each of which corresponds to the first direction.

Further, a terminal end portion 33*a* located at the terminal end of the first middle frame 33 in the −Y direction is bent along the XZ plane and extends in the ±Z directions. Then, the position of the terminal end portion 33*a* in the ±Y directions is substantially the same as the position of the terminal end portion 27*a* of the base frame 20. Similarly, a terminal end portion 34*a* located at the terminal end of the second middle frame 34 in the −Y direction is bent along the XZ plane and extends in the ±Z directions. Then, the position of the terminal end portion 34*a* in the ±Y directions is substantially the same as the position of the terminal end portion 27*a* of the base frame 20. In other words, the terminal end portion 27*a* of the base frame 20, the terminal end portion 33*a* of the first middle frame 33, and the terminal end portion 34*a* of the second middle frame 34 are located on the same virtual plane, and this virtual plane is a plane along the XZ plane. The terminal end portion 33*a* of the first middle frame 33 corresponds to a second terminal end portion, and the terminal end portion 34*a* of the second middle frame 34 corresponds to a third terminal end portion.

The terminal end portion 27*a* of the base frame 20 is disposed between the terminal end portion 33*a* of the first middle frame 33 and the terminal end portion 34*a* of the second middle frame 34 in the ±X directions. Further, the above-described recessed portion 27*b* of the base frame 20 is provided between the terminal end portion 27*a* of the base frame 20 and the terminal end portion 33*a* of the first middle frame 33, and the recessed portion 27*b* is also provided between the terminal end portion 27*a* of the base frame 20 and the terminal end portion 34*a* of the second middle frame 34. Note that the recessed portions 27*b* need not necessarily be provided on both sides of the terminal portion 27*a*, and the recessed portion 27*b* may be provided only on one side thereof.

When assembling the recording device 1, other components constituting the recording device 1, that is, various structural components, mechanical components, electronic components, and the like are disposed inside the above-described frame structure and supported by the frame structure. For example, the medium moving unit 4 is disposed on the second support portion 20*b* of the base frame 20, between the first middle frame 33 and the second middle frame 34 in the ±X directions. Further, the recording unit 10 is supported by the main frame 35, and the carriage 12 moves in the ±X directions along the main frame 35. In other words, the recording unit 10 is supported by the first side frame 31, the second side frame 32, the first middle frame 33, and the second middle frame 34 via the main frame 35. Further, the power supply box 15 (see FIG. 4) described above is supported by the first middle frame 33. However, the power supply box 15 may be supported by the second middle frame 34, the first side frame 31, or the second side frame 32, or may be directly supported by the base frame 20.

As illustrated in FIG. 4, in the recording device 1 after the assembly thereof is complete, in a state in which the rear cover 3 is removed, the three terminal portions 27*a*, 33*a*, and 34*a* are exposed to the outside. Further, these terminal end portions 27*a*, 33*a*, and 34*a* are located farthest in the −Y direction even after the assembly of the recording device 1 is complete. Thus, when the rear surface of the recording device 1, that is, the terminal end portions 27*a*, 33*a*, and 34*a* are caused to face downward, namely, when the recording device 1 is caused to be in an upright posture on a horizontal surface, that is, in a posture in which the medium moving unit 4 extends in the vertical direction, the terminal end portions 27*a*, 33*a*, and 34*a* come into contact with the horizontal surface and the recessed portions 27*b* are separated from the horizontal surface.

Figure 7:
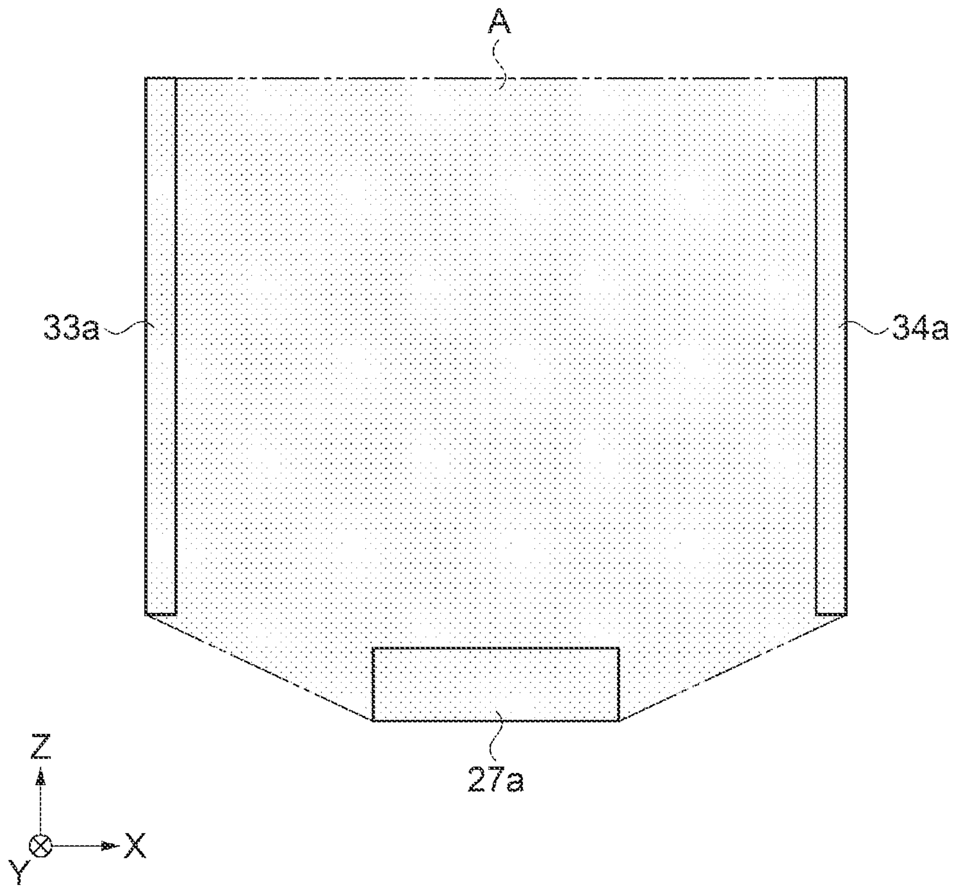
FIG. 7 is an explanatory diagram illustrating a region surrounded by terminal end portions.

In this posture, the recording device 1 according to the embodiment is configured such that the center of gravity thereof is positioned vertically above a region A (see FIG. 7) surrounded by the three terminal end portions 27*a*, 33*a*, and 34*a*. Here, the region A is a region indicated by a dot pattern in FIG. 7, and is a region within a range defined by straight lines connecting the outer edges of the three separated terminal end portions 27*a*, 33*a*, and 34*a*. Thus, the recording device 1 does not easily fall over even in the posture in which the medium moving unit 4 extends in the vertical direction, and can maintain the posture in a stable manner. Note that, when causing the recording device 1 to be in the upright posture, the medium support unit 5 can be fixed to the medium moving unit 4 inside the through hole 2*t*, so that the medium support unit 5 does not fall further to the rear side than the through hole 2*t*, that is, does not move downward. Hereinafter, a posture of the recording device 1 in which the terminal end portions 27*a*, 33*a*, and 34*a* face downward and the medium moving unit 4 extends in the vertical direction will be also referred to as a vertical posture. In contract to this, an original posture of the recording device 1 will be also referred to as a horizontal posture.

When transporting the recording device 1 configured as described above, in a case in which a narrow entrance or the like is included in a transport path, the recording device 1 is placed on a trolley or the like in the vertical posture with the rear cover 3 removed therefrom. Then, when installing the recording device 1, the recording device 1 is unloaded from the trolley or the like and installed at a predetermined position in the horizontal posture, and then the rear cover 3 is mounted at the rear surface. Note that, for example, when changing the posture of the recording device 1 from the horizontal posture to the vertical posture, or when shifting the position of the recording device 1 having the vertical posture, an operator can perform the operation without their hand being caught between the terminal end portion 27*a* and the horizontal surface, by placing their hands on the recessed portions 27*b*.

As described above, with the recording device 1 according to the embodiment, it is possible to obtain the following effects.

According to the embodiment, when the respective terminal end portions 27*a*, 33*a*, and 34*a*, in the −Y direction, of the base frame 20, the first middle frame 33, and the second middle frame 34 are caused to face downward and brought into contact with the horizontal surface, the center of gravity of the recording device 1 is positioned vertically above the region A surrounded by the three terminal end portions 27*a*, 33*a*, and 34*a*. Thus, even when the recording device 1 is caused to be in the upright so as to be long in the vertical direction, the posture of the recording device 1 can be stabilized. As a result, it is not necessary to fix the recording device 1 to a jig, and the transport of recording device 1 thus becomes easy.

According to the embodiment, since the recessed portions 27*b* are provided at the end portion 27 of the base frame 20 in the −Y direction, for example, when the operator causes the recording device 1 to be in the upright posture on the horizontal surface, it is possible to inhibit the hand of the operator from being caught between the terminal end portion 27*a* and the horizontal surface, by the operator placing their hands on the recessed portions 27*b*.

According to the embodiment, since the recessed portions 27*b* that are used by the operator to place their hands are provided between the terminal end portion 27*a* of the base frame 20 and the terminal end portion 33*a* of the first middle frame 33 and between the terminal end portion 27*a* of the base frame 20 and the terminal end portion 34*a* of the second middle frame 34, the recording device 1 is inhibited from becoming unstable when the recording device 1 is caused to be in the upright posture.

According to the embodiment, since the recording unit 10, which is caused to perform the scanning along the ±X directions, is supported by the first side frame 31, the second side frame 32, the first middle frame 33, and the second middle frame 34, which are disposed so as to be separated from each other in the ±X directions, it is possible to support the recording unit 10 in a stable manner even when the recording device 1 is in the upright posture.

According to the embodiment, since the power supply box 15 is supported by the first middle frame 33, even when the recording device 1 is in the upright posture, the power supply box 15 can be supported in a stable manner.

The embodiment described above may be modified as follows.

In the embodiment described above, when setting the posture of the recording device 1 to the vertical posture, the terminal end portions 27*a*, 33*a*, and 34*a* in the −Y direction, which is one side in the moving direction of the medium support unit 5, that is, the one side in the ±Y directions, are caused to face downward, but the configuration is not limited to this example. For example, if the first middle frame 33 and the second middle frame 34 are both extended in the +Y direction up to the position of the end portion 28 of the base frame 20 in the +Y direction, it is also possible to cause the recording device 1 to have the vertical posture in which terminal end portions in the +Y direction face downward.

In the embodiment described above, the liquid discharged by the recording unit 10 is not limited to the ink. For example, the recording unit 10 may discharge a liquid body containing a material, such as an electrode material or a color material used to manufacture various types of displays, in a dispersed state or a dissolved state.

In the embodiment described above, the recording device 1 is a device that performs printing on the medium, and may be a serial printer, a lateral printer, a line printer, a page printer, or the like. Further, a recording method is not limited to the inkjet method, and may be a thermal method, a dot-impact method, a laser method, or the like.

What is claimed is:

1. A recording device comprising:

a medium support unit supporting a medium;

a moving unit configured to move the medium support unit along a first direction;

a recording unit including a recording head configured to perform recording on the medium, and configured to perform scanning along a second direction intersecting the first direction;

a first frame having a flat plate shape along the first direction and the second direction, and configured to support the moving unit; and a second frame and a third frame supported by the first frame and disposed along the first direction in a posture intersecting the first frame, wherein the moving unit is disposed between the second frame and the third frame in the second direction, wherein a first terminal end portion located at a terminal end on one side of the first frame in the first direction is disposed between a second terminal end portion located at a terminal end on the one side of the second frame and a third terminal end portion located at a terminal end on the one side of the third frame, and when the first terminal end portion, the second terminal end portion, and the third terminal end portion are caused to face downward and brought into contact with a horizontal surface, a center of gravity of the recording device is positioned vertically above a region surrounded by the first terminal end portion, the second terminal end portion, and the third terminal end portion, and wherein an end portion of the first frame on the one side is provided with a recessed portion, the recessed portion being separated from the horizontal surface when the first terminal end portion, the second terminal end portion, and the third terminal end portion are brought into contact with the horizontal surface.

2. The recording device according to claim 1, wherein the recessed portion is provided at at least one of between the first terminal end portion and the second terminal end portion and between the first terminal end portion and the third terminal end portion.

3. The recording device according to claim 1, wherein the recording unit is supported by the second frame and the third frame.

4. The recording device according to claim 1, comprising a power supply box configured to supply power, wherein the power supply box is supported by the first frame, the second frame, or the third frame.

5. The recording device according to claim 1, wherein the medium support unit includes a tray that supports the medium.

6. The recording device according to claim 5, wherein the medium support unit includes a stage as a support table that supports the tray.

* * * * *